(12) United States Patent
Kim et al.

(10) Patent No.: US 7,443,439 B2
(45) Date of Patent: Oct. 28, 2008

(54) CAMERA LENS MODULE POP-UP DEVICE FOR PORTABLE WIRELESS TERMINAL

(75) Inventors: Sang-Hyeon Kim, Daegu (KR); Yong-Woo Jeon, Gumi-si (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 607 days.

(21) Appl. No.: 10/946,121

(22) Filed: Sep. 22, 2004

(65) Prior Publication Data

US 2005/0200740 A1 Sep. 15, 2005

(30) Foreign Application Priority Data

Mar. 15, 2004 (KR) .................. 10-2004-0017301

(51) Int. Cl.
*H04N 5/225* (2006.01)
(52) U.S. Cl. ..................... 348/335; 348/373
(58) Field of Classification Search ........... 348/335, 348/373
See application file for complete search history.

(56) References Cited

U.S. PATENT DOCUMENTS

2001/0036845 A1* 11/2001 Park ....................... 455/566

FOREIGN PATENT DOCUMENTS

EP 0930770 7/1999
EP 1324594 7/2003
GB 2389988 * 12/2003
JP 10075287 3/1998

OTHER PUBLICATIONS

European Search Report for Application No.05005357.8-2202 PCT/.

* cited by examiner

*Primary Examiner*—James M Hannett
(74) *Attorney, Agent, or Firm*—Roylance, Abrams, Berdo & Goodman, L.L.P.

(57) ABSTRACT

Disclosed herein is a camera lens module pop-up device for a portable wireless terminal which enables insertion and extraction of a camera lens module into and from the portable wireless terminal in a pop-up manner. The device comprises a terminal housing formed with a lens hole, a camera lens module coupled through the lens hole in such a fashion that it can be inserted into or extracted from the lens hole as it is pushed laterally, and can rotate about a hinge axis thereof when being extracted, a rotation cam unit provided at an end surface of the camera lens module for adjusting or restraining a rotation angle of the camera lens module in a stepwise manner when the camera lens module is extracted from the lens hole, and a lens pop-up module coupled to the camera lens module so as to extend in a hinge axis direction for enabling the camera lens module to be inserted and extracted through the lens hole when the camera lens module is pushed laterally, and for enabling the camera lens module to rotate upon extraction thereof.

20 Claims, 16 Drawing Sheets

CAMERA LENS MODULE POP-UP DEVICE FOR PORTABLE WIRELESS TERMINAL

CROSS-REFERENCE TO RELATED APPLICATION

This application claims the benefit under 35 U.S.C. §119 (a) of an application entitled "CAMERA LENS MODULE POP-UP DEVICE FOR PORTABLE WIRELESS TERMINAL", filed in the Korean Intellectual Property Office on Mar. 15, 2004, which was assigned Serial No. 2004-17301, the entire contents of which are hereby incorporated by reference.

BACKGROUND OF THE INVENTION

1. Field of the Invention

The present invention relates to a camera lens module pop-up device for a portable wireless terminal. More particularly, the present invention relates to a camera lens module pop-up device for a portable wireless terminal which enables insertion and extraction of a camera lens module into and from the portable wireless terminal in a pop-up manner.

2. Description of the Related Art

Generally, "portable communication devices" means devices that are portable and enable wireless communication capabilities for the owners of the devices. The portable communication devices tend to be much thinner and lighter in consideration of their portability. Their functionality has been rapidly diversifying. There is a trend toward miniaturization of the devices, both in size and weight, as well as a trend in diversifying the functions. The applications for the portable communication devices will expand in the future, and accordingly future portable communication devices will be altered to adapt to the various multimedia environments or Internet environments. Nowadays, the use of the portable communication devices crosses all demographics without distinction of age, sex, time or place, and thus the portable wireless terminals are now recognized as a ubiquitous necessity of daily life.

On the basis of their structural forms, for example, the portable communication devices may be classified into a bar-type wireless communication device, a flip-type wireless communication device, and a folder-type wireless communication device. The bar-type wireless communication device comprises a single bar-type housing. While, the flip-type wireless communication device comprises a bar-type housing and a flip part pivotably coupled to the housing by means of a hinge device. Finally, the folder-type wireless communication device comprises a bar-type housing and a folder part pivotably coupled to the housing in a foldable manner by means of a hinge device.

Further, on the basis of the manner or positions in which they are worn, the portable communication devices may be classified into a neck wearable type device or a wrist wearable type device. The neck wearable device is configured to be worn around the user's neck. The wrist wearable type device is configured to be worn on the user's wrist.

Furthermore, on the basis of their opening and closing operations, the portable communication devices may be classified into a rotation type wireless device or a sliding type wireless device. In case of the rotation type wireless device, its two housings are rotatably connected to be opened away from or closed to each other in a state wherein their facing surfaces are in contact with each other. In case of the sliding-type wireless device, its two housings are opened away from or closed to each other by their longitudinal sliding movements. Those skilled in the art will appreciate the various portable wireless devices as mentioned above.

Functionally, the conventional portable communication devices have been developed to enable high-speed data communication, in addition to voice communication. Since a consumer's desire for this high-speed data communication continues to increase, in the near future, portable communication devices may provide various associated services with the aid of a wireless communication technique enabling high-speed data transmission.

Currently, the conventional portable communication devices have a camera lens for the transmission of video signals, filming of a desired subject, and the like.

According to this latest trend, generally, the portable communication devices include a camera lens module internally or externally, and enable video conferencing between a user and another party, or filming of a desired subject.

However, the conventional portable communication devices have a problem in that a camera lens housing employed for video conferencing and filming of a desired subject cannot be protected from the external environment, which results in the camera lens becoming dirty.

In order to protect the camera lens from the external environment, there exists the need for a separate protective device for preventing the continuous exposure of the camera lens to the external environment.

If such a separate protective device is employed for protecting the camera lens, it inevitably increases the volume of the conventional portable communication devices.

Portable wireless terminals with the conventional cameral lens are designed only to enable rotation of the camera lens in a vertical direction and are limited to only a limited number of special uses.

The portable wireless terminals having the conventional camera lens, furthermore, suffer from the inconvenience of having to constantly adjust the rotation angle of the camera lens since the camera lens is not designed to stop at any predetermined angles when rotated.

SUMMARY OF THE INVENTION

Therefore, the present invention has been made in view of the above problems. It is an object of the present invention to provide a camera lens module pop-up device for a portable wireless terminal, which can allow a camera lens module to be inserted into or extracted from the portable wireless terminal through a one-touch operation, thereby making its use more convenient.

It is another object of the present invention to provide a camera lens module pop-up device for a portable wireless terminal, which can allow a camera lens module to be inserted into or extracted from the portable wireless terminal in a one-touch manner and thereby keep the camera lens module inside a terminal housing when not using it. This results in effective protection of the camera lens module from the external environment and prevents contamination of the camera lens module.

It is yet another object of the present invention to provide a camera lens module pop-up device for a portable wireless terminal, which enables stepwise adjustment in the rotation angle of a camera lens module. This feature improves both the rotation performance of a camera lens and the convenience of using the device.

In accordance with an aspect of the present invention, the above and other objects can be accomplished by the provision of a camera lens module pop-up device for a portable wireless terminal comprising a terminal housing formed with a lens hole. The portable wireless terminal also comprises a camera lens module coupled through the lens hole in such a fashion that it can be inserted into or extracted from the lens hole as it is pushed laterally. The camera lens module can rotate about a hinge axis thereof when being extracted because of a rotation cam unit provided at an end surface of the camera lens module for adjusting or restraining a rotation angle of the camera lens module in a stepwise manner when the camera lens module is extracted from the lens hole. Finally, the portable wireless terminal further comprises a lens pop-up module coupled to the camera lens module extending in a hinge axis direction for enabling the camera lens module to be inserted and extracted through the lens hole when the camera lens module is pushed laterally, and for enabling the camera lens module to rotate upon extraction thereof.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE PREFERRED EMBODIMENTS

Now, a preferred embodiment of the present invention will be described in detail with reference to the annexed drawings.

Figure 1:
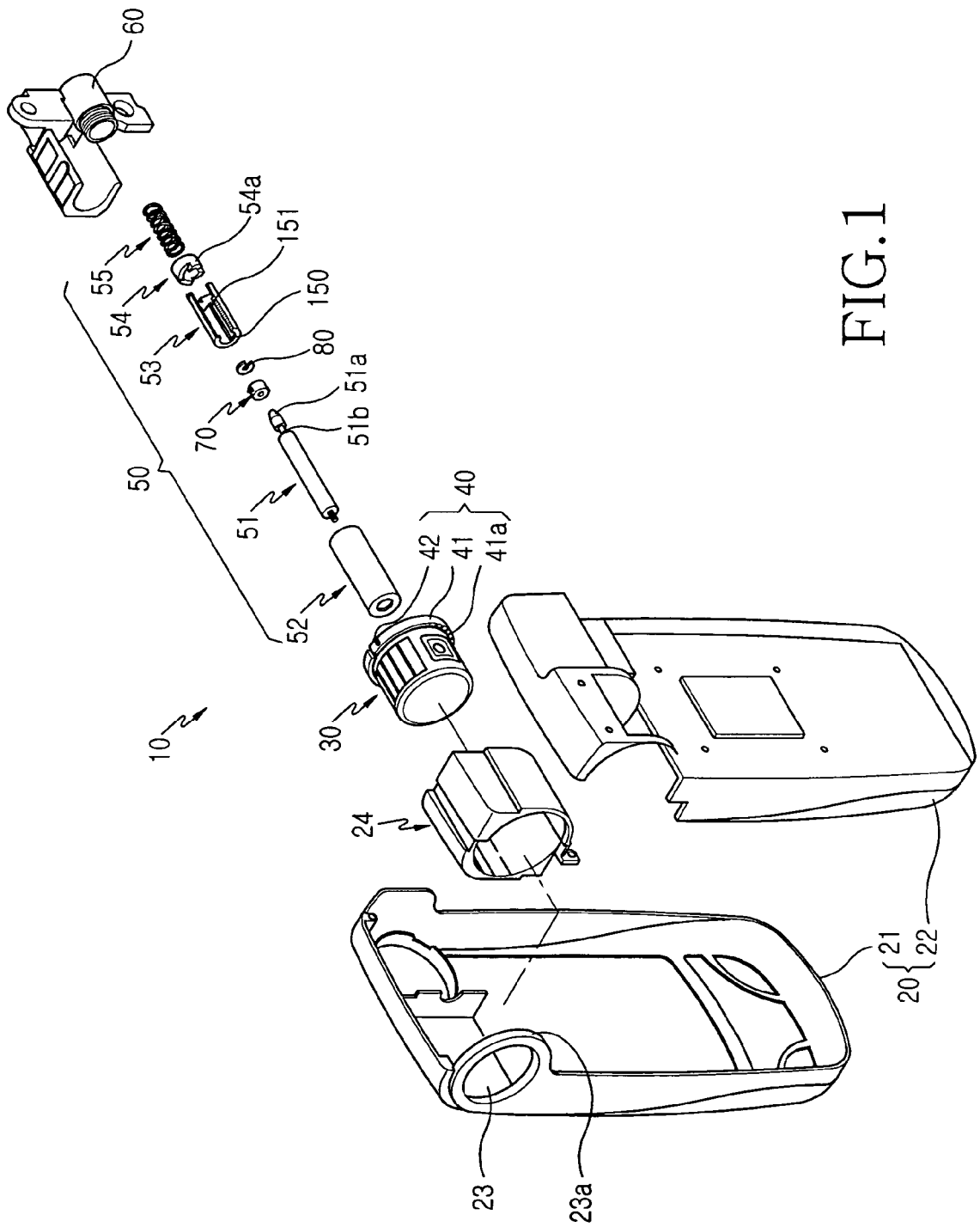
FIG. 1 is an exploded perspective view illustrating a camera lens module pop-up device for a portable wireless terminal in accordance with an embodiment of the present invention.

FIGS. 1 to 16 illustrate a camera lens module pop-up device for a portable wireless terminal in accordance with an embodiment of the present invention. Referring to FIG. 1, the pop-up device, which is designated as reference numeral 10, comprises a portable wireless terminal housing 20, a cylindrical camera lens module 30, a rotation cam unit 40, and a lens pop-up module 50. The terminal housing 20 preferably consists of a first and second housing 21 and 22. One of the housings 21 and 22 is formed at a lateral surface thereof with a lens hole 23 for allowing the camera lens module 30 to be coupled therethrough. That is, the camera lens module 30 is coupled through the lens hole 23 in such a fashion that it can be inserted into or extracted from the lens hole 23 as it is pushed laterally. Once extracted from the lens hole 23, the camera lens module 30 can rotate about the hinge axis (A1, shown in FIG. 2). The rotating cam unit 40 is positioned at one end surface of the camera lens module 30, and serves to adjust or retain the rotation angle of the camera lens module 30 at predetermined steps when it is extracted from the lens hole 23. The lens pop-up module 50 is coupled to the camera lens module 30 about the hinge axis (A1, shown in FIG. 2), which enables the camera lens module 30 to be inserted and extracted through the lens hole 23 when it is pushed laterally. It also enables the camera lens module 30 to rotate when it is extracted from the lens hole 23.

Referring to FIG. 1, inside the terminal housing 20 is provided a lens housing 24 for guiding longitudinal insertion and extraction of the camera lens module 30. In this way, the lens hole 23 is formed at a predetermined position on the lateral surface of the terminal housing 20. Then, the lens housing 24, the camera lens module 30, the rotation cam unit 40, and the lens pop-up module 50 are successively coupled together longitudinally in the direction of the camera lens module 30.

Figure 12:
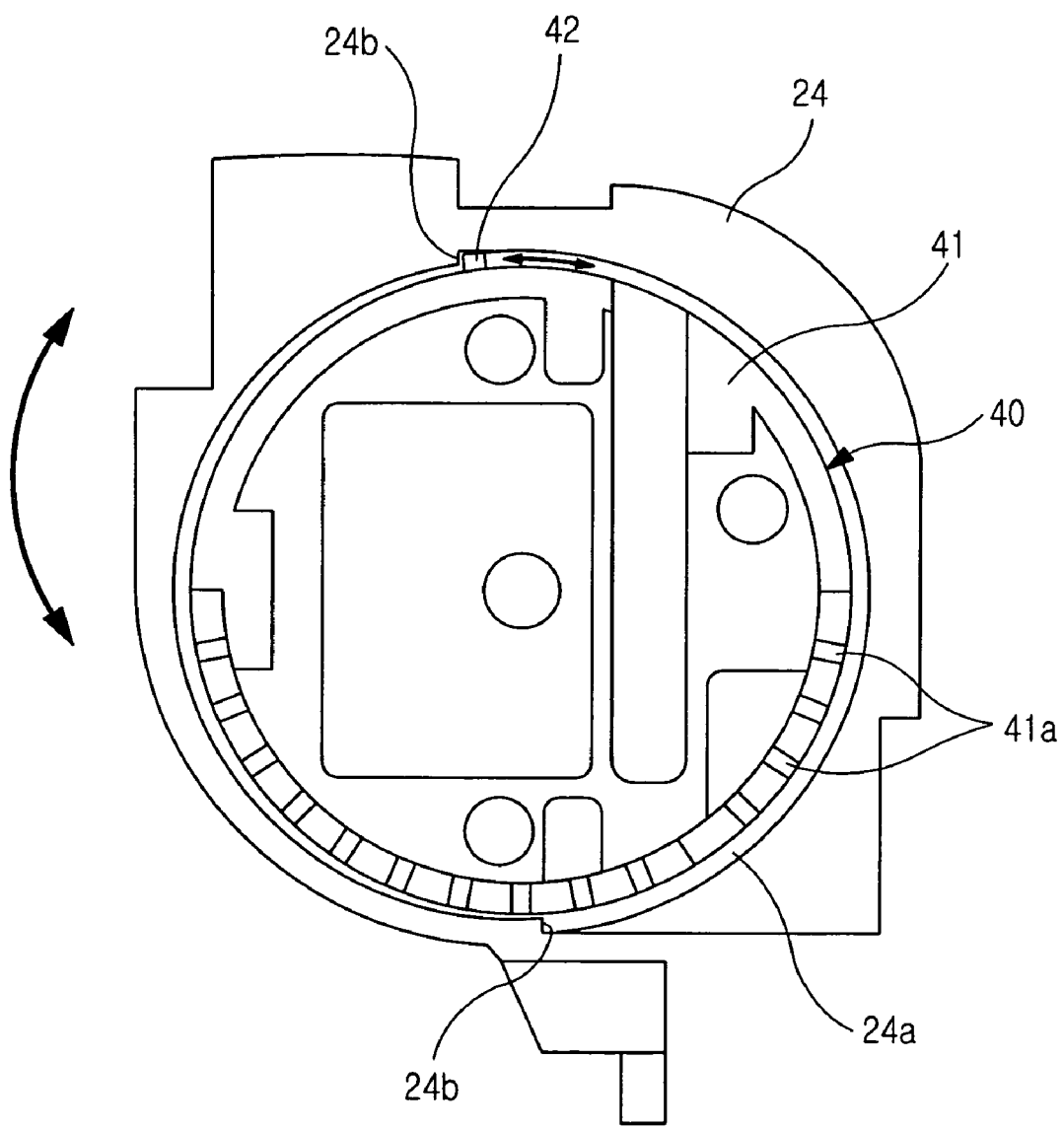
FIGS. 12 and 13 are sectional views illustrating bi-directional rotation of a rotation cam unit inside an exemplary lens housing in accordance with the preferred embodiment of the present invention.

Referring to FIG. 12, the lens housing 24 has an inner peripheral surface with a recess 24a for use in coupling the lens housing 24 to the rotation cam unit 40. The recess 24a has a size and shape for allowing the camera lens module 30 to preferably rotate forward or reverse within a range of 180 degrees, thereby preventing the flexible printed circuit board (FPCB) (not shown), provided in the camera lens module 30, from getting tangled. Stops 24b are formed at both ends of the recess 24a to limit the forward or reverse rotation of the rotation cam unit 40 to a range of 180 degrees. A detent 42 formed on the rotation cam unit 40 comes into contact with one of the stops 24b to stop the rotation of the rotation cam unit 40.

Figure 2:
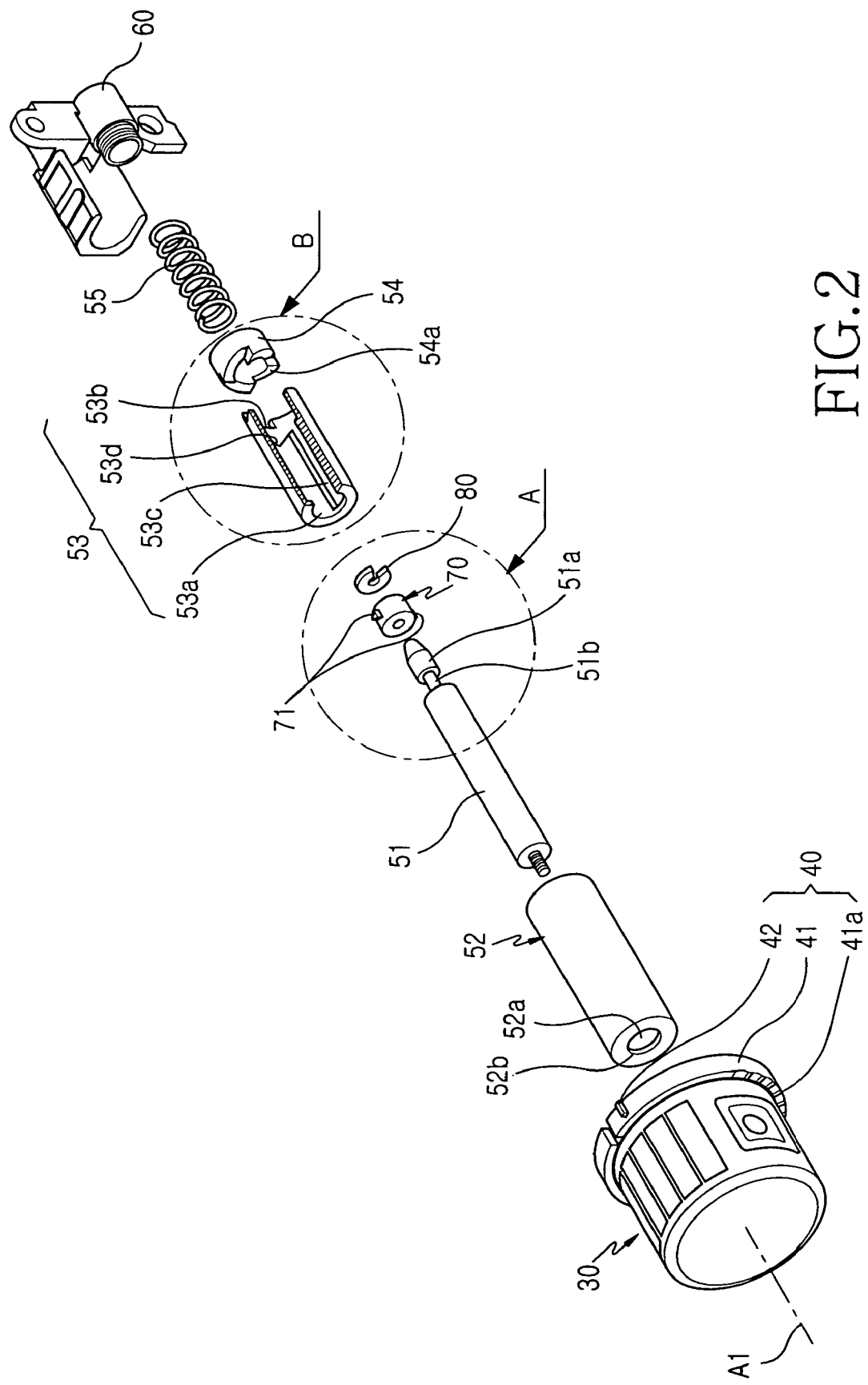
FIG. 2 is a partial exploded perspective view of the camera lens module pop-up device shown in FIG. 1, in accordance with an embodiment of the present invention.

The rotation cam unit 40 comprises a rotation ring 41, and the detent 42. The rotation ring 41 is formed on the outer circumference of the rotation cam unit 40 to engage or disengage the adjustment pin 23b that formed at a hole housing 23a of the lens hole 23. The rotation ring 41 engages and disengages the adjustment pin 23b at preset points or steps as the camera lens module 30 is rotated to enable stepwise adjustment in the rotation angle of the camera lens module 30. To accomplish this, the rotation ring 41 is formed with a plurality of adjustment pin recesses 41a so that the adjustment pin 23b can be engaged or disengaged according to rotation of the rotation cam unit 40. The plurality of adjustment pin recesses 41a are arranged so that the rotation cam unit 40 can preferably rotate in intervals of approximately 10 degrees about the hinge axis (A1 as shown in FIG. 2) of the camera lens module 30. The detent 42 on the rotation cam unit 40 protrudes outward from the outer circumference of the rotation ring 41. The detent 42 moves forward or reverse inside the recess 24a within the inner peripheral surface of the lens housing 24. The movement of the detent 42 is restrained by the stops 24b.

Referring back to FIG. 1, the lens pop-up module 50 comprises a shaft 51, a pop-up cylinder 52, a lens stopper cam 53, a guide cam 54, and a coil spring 55. The shaft 51 is aligned with the camera lens module 30 so that it can preferably be longitudinally screwed into the rotation cam unit 40. The shaft 51 is coupled inside the pop-up cylinder 52 in such a fashion that it can be freely inserted into or extracted from the pop-up cylinder 52 in a longitudinal direction. Inside the pop-up cylinder 52 is also coupled the lens stopper cam 53. The lens stopper cam 53 serves to retain or release the shaft 51 so that the shaft 51 can be inserted into or extracted from the pop-up cylinder 52 when the camera lens module 30 is pushed laterally. The guide cam 54 is positioned to correspond to the lens stopper cam 53 inside the pop-up cylinder 52, and serves to guide a latch member 70 provided at the shaft 51. The coil spring 55 is interposed between the pop-up cylinder 52 and the shaft 51, and serves to provide elasticity to the shaft 51 for allowing the shaft 51 to be inserted into or extracted from the pop-up cylinder 52.

One end of the shaft 51 is screwed to the rotation cam unit 40 so that it moves laterally with the camera lens module 30. The other end of the shaft 51 forms a spring coupling protrusion 51a to be coupled with the coil spring 55. Further, a latch member 70 is provided at a certain position on the shaft 51. The latch member 70 moves with the shaft 51 as the camera lens module 30 is pushed laterally, thereby serving to separate the guide cam 54 from the lens stopper cam 53. The latch member 70 is guided by the guide cam 54 so as to rotate in one direction.

Figure 3:
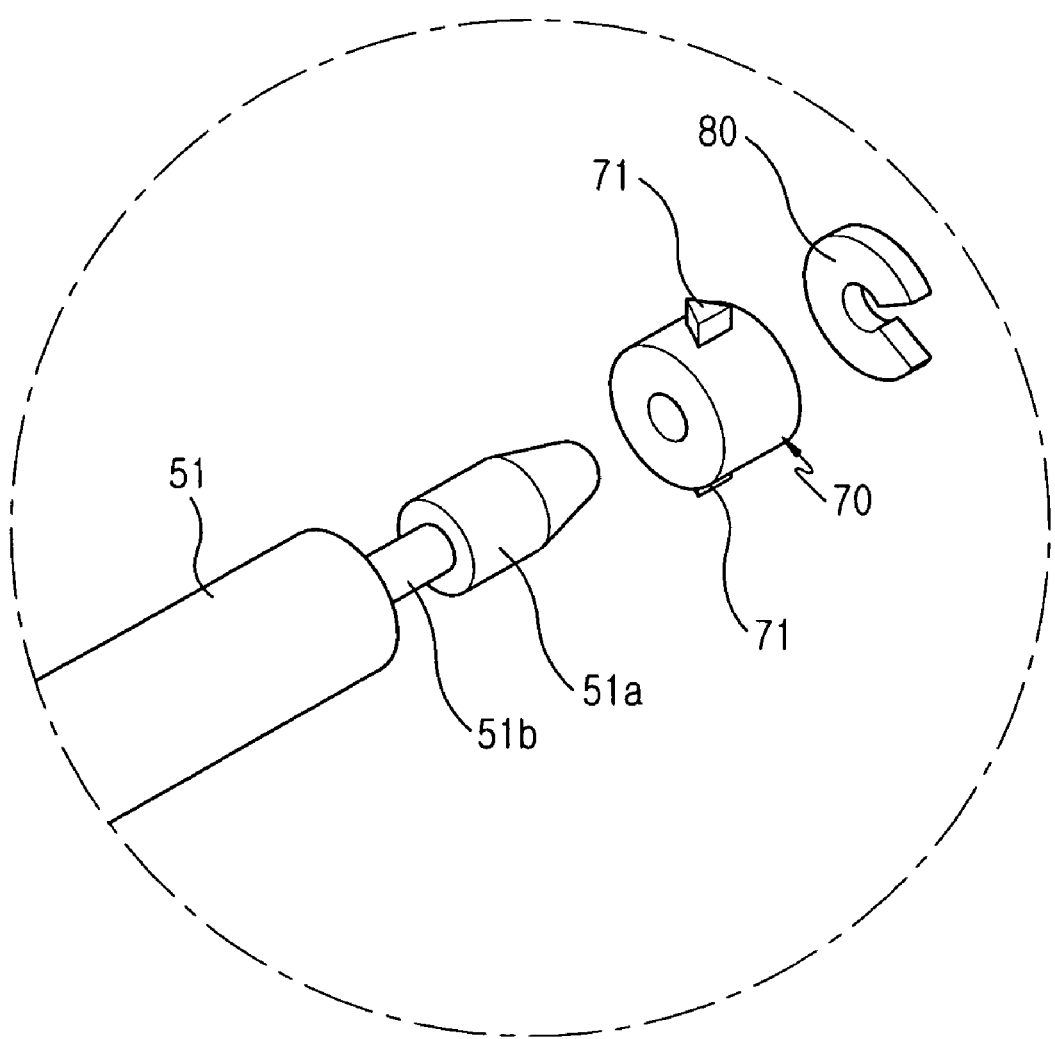
FIG. 3 is an enlarged exploded perspective view of the circle (A) shown in FIG. 2 according to an embodiment of the present invention.

Referring now to FIG. 2, detail A, which is shown in FIG. 3, the latch member 70 fits around the latch coupling rod 51b of the shaft 51. Between the latch member 70 and the spring coupling protrusion 51A is interposed an E-ring 80 to secure the latch member 70. The latch member 70 includes a pair of latches 71, which are preferably symmetrically positioned about the hinge axis (A1). Each of the latches 71 preferably has an inclined polygonal outer circumference suitable for its guiding on guide teeth 54a formed at the guide cam 54.

The pop-up cylinder 52 has a through-hole 52a for the insertion and extraction of the shaft 51. In order to prevent the shaft 51 from being completely extracted therefrom, the through-hole 52a is formed with a retaining portion 52b for allowing the shaft 51 to be caught and stopped when extracted.

Referring back to FIG. 1, inside the terminal housing 20 is further provided a cylinder support member 60, which is screwed to one end of the pop-up cylinder 52 so that it can support the coil spring 55.

Referring to FIG. 2, the lens stopper cam 53 has an opening 53a, a plurality of stopper teeth 53b, a pair of sliding slits 53c, and a pair of holding slits 53d. The opening 53a is formed at one end of the lens stopper cam 53 and has a size and shape suitable for the longitudinal insertion and extraction of the shaft 51. The plurality of stopper teeth 53b are circumferentially arranged at the other end of the lens stopper cam 53 in engage and disengage the guide teeth 54a of the guide cam 54 as the camera lens module 30 is pushed laterally. The pair of sliding slits 53c in the inner peripheral surface of the lens stopper cam 53 extend along the longitudinal direction of the lens stopper cam 53. These sliding slits 53c are used for the sliding movement of the latches 71 formed on the latch member 70. The pair of holding slits 53d are formed between the sliding slits 53c, respectively. In a state wherein the latches 71 of the latch member 70 slide along the sliding slits 53c, and are guided and rotated by the guide cam 54, the holding slits 53d serve to allow the latches 71 to be inserted and fixed thereby.

Figure 4:
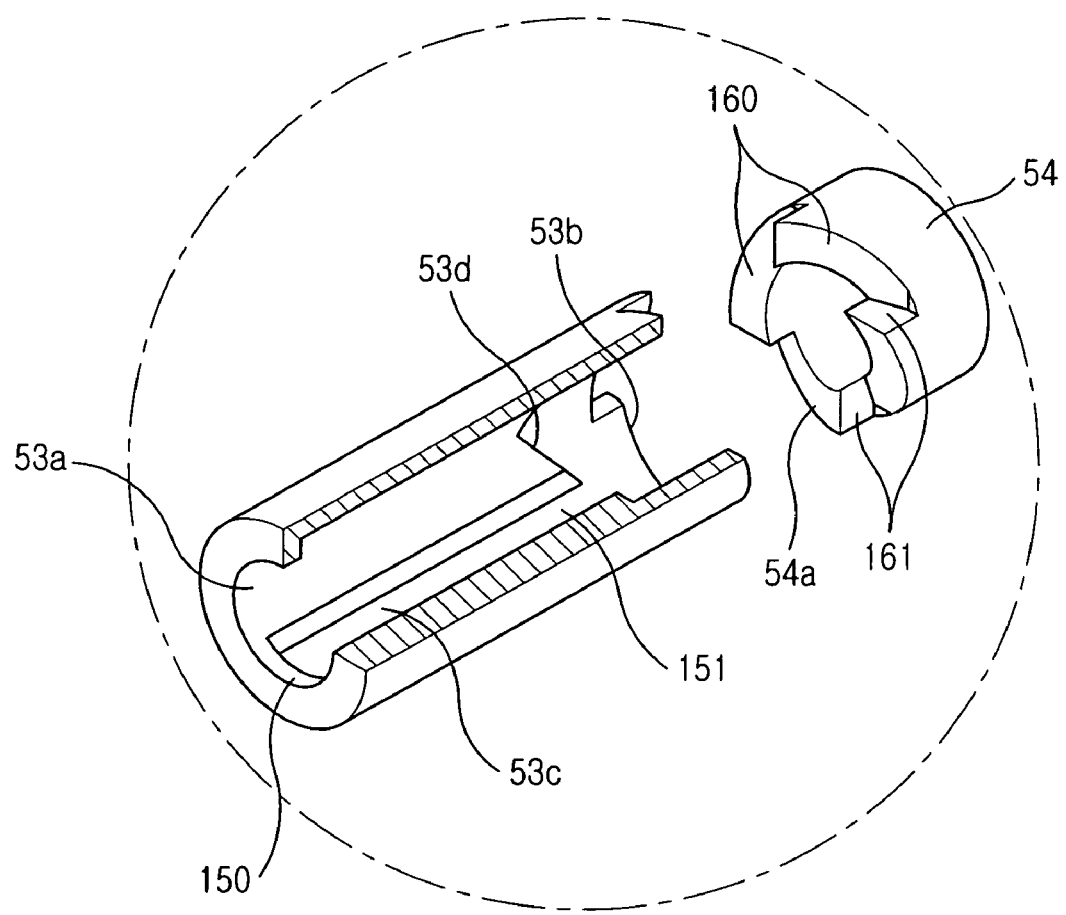
FIG. 4 is an enlarged exploded perspective view of the circle (B) shown in FIG. 2 according to an embodiment of the present invention.

Referring to FIG. 4, the guide teeth 54a at the lateral surface of the guide cam 54 guide and rotate the latches 71 of the latch member 70 as the camera lens module 30 is pushed laterally. At one-side end of each of the sliding slits 53c is formed a retainer portion 150, which catch the latches 71 of the latch member 70 when the shaft 51 is extracted along with the camera lens module 30 as the camera lens module 30 is pushed laterally. Consequently, the shaft 51 is prevented from being completely extracted therefrom. At the other end of each of the sliding slits 53c is formed an insert portion 151 for use in the insertion of the latches 71 of the latch member 70.

Each of the holding slits 53d is preferably tapered inward for guiding the latches 71 of the latch member 70 in such a fashion that the latches 71 can be inserted therein or separated therefrom.

Each of the guide teeth 54a consists of an inclined guide surface 160, and a holding end surface 161. When the latches 71 of the latch member 70 are circumferentially moved toward the guide teeth 54a to contact the guide cam 54, the inclined guide surfaces 160 of the guide teeth 54a allow the latches 71 to rotate in one direction. The holding end surfaces 161 of the guide teeth 54a engage the latches 71 and stop their rotation.

The operation of the camera lens module pop-up device 10 for portable wireless terminals in accordance with the preferred embodiment of the present invention will be explained in more detail with reference to FIGS. 1 to 16.

As shown in FIGS. 1 and 2, the camera lens module pop-up device 10 for portable wireless terminals basically comprises the portable wireless terminal housing 20 formed with the lens hole 23, the camera lens module 30, the rotation cam unit 40, and the lens pop-up module 50.

Figure 5:
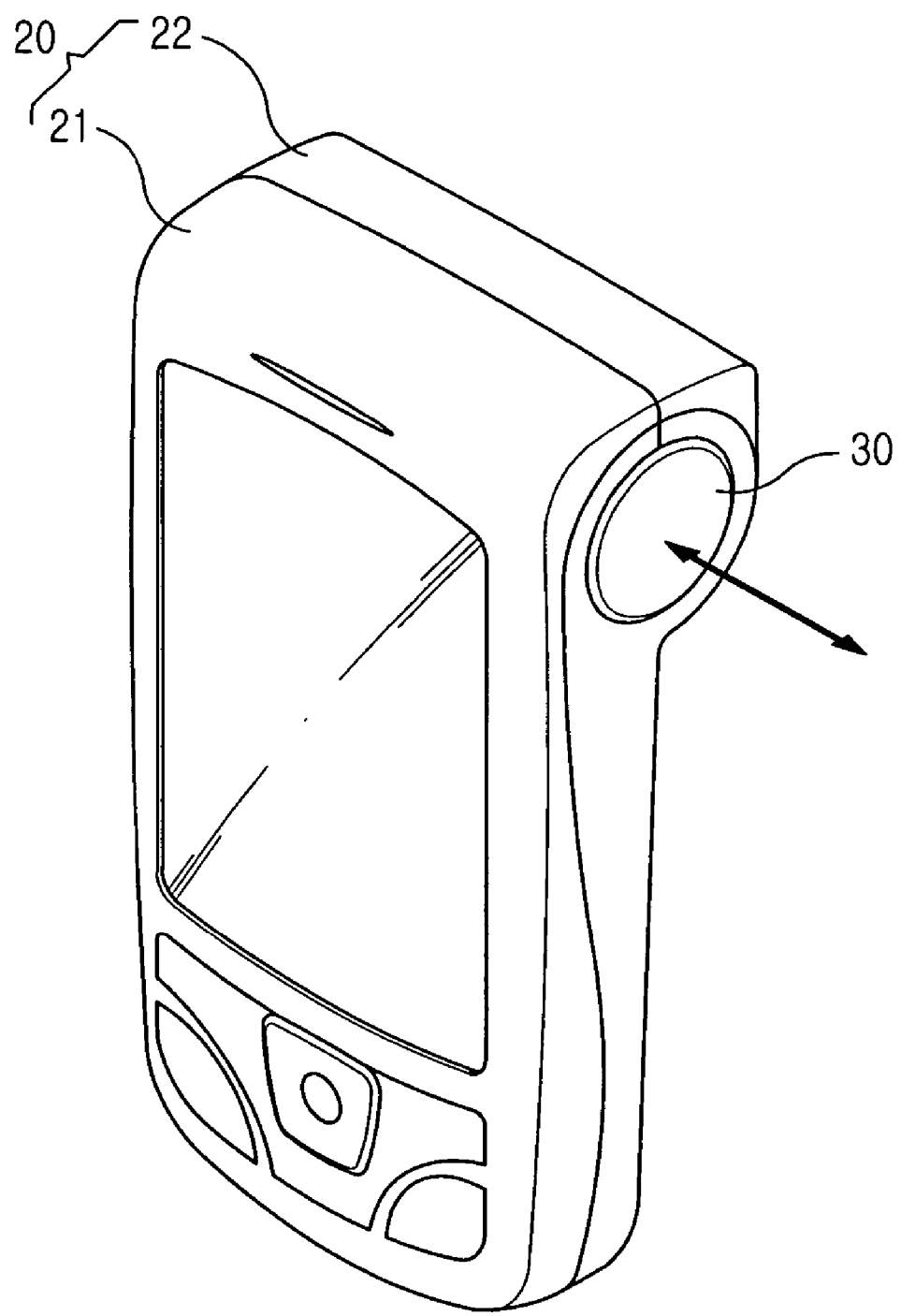
FIG. 5 is a front perspective view illustrating an assembled state of the camera lens module pop-up device for a portable wireless terminal in accordance with an embodiment of the present invention.
Figure 6:
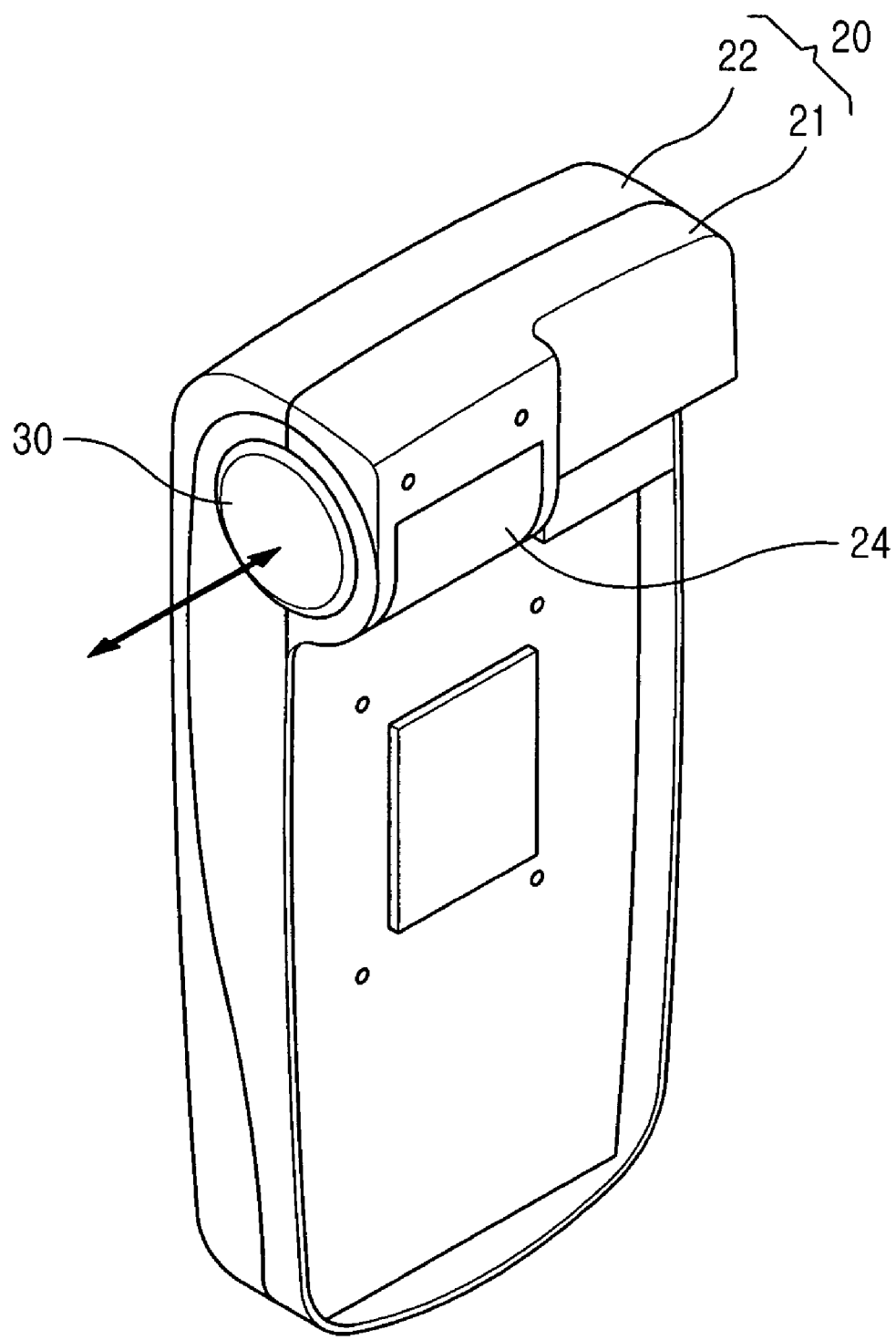
FIG. 6 is a rear perspective view of the assembled camera lens module pop device shown in FIG. 5, in accordance with an embodiment of the present invention.

Referring to FIGS. 5 and 6, the camera lens module 30 is extractable to the exterior of the portable wireless terminal housing 20 through the lens hole 23 formed at a predetermined position on the lateral surface of the terminal housing 20 as it is pushed laterally.

That is, through such a pushing operation, the camera lens module 30 is extracted to the outside from the lens hole 23.

Figure 11:
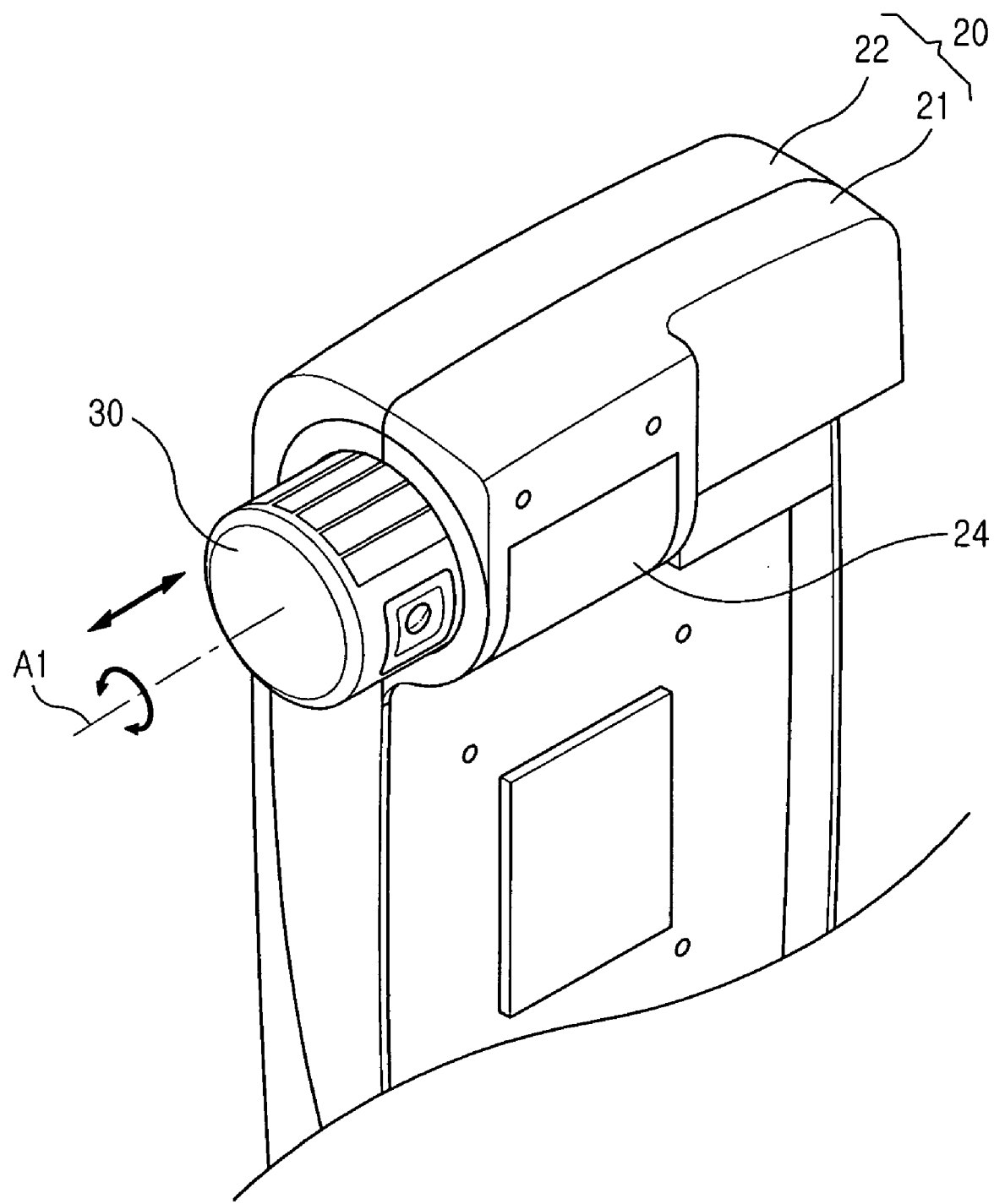
FIG. 11 is a partially cut-away rear perspective view illustrating an exemplary state wherein the camera lens module is extracted from a terminal housing according to an embodiment of the present invention.

In this case, such an extraction of the camera lens module 30 as shown in FIG. 11 is achievable by the lens pop-up module 50 located within the terminal housing 20.

Figure 7:
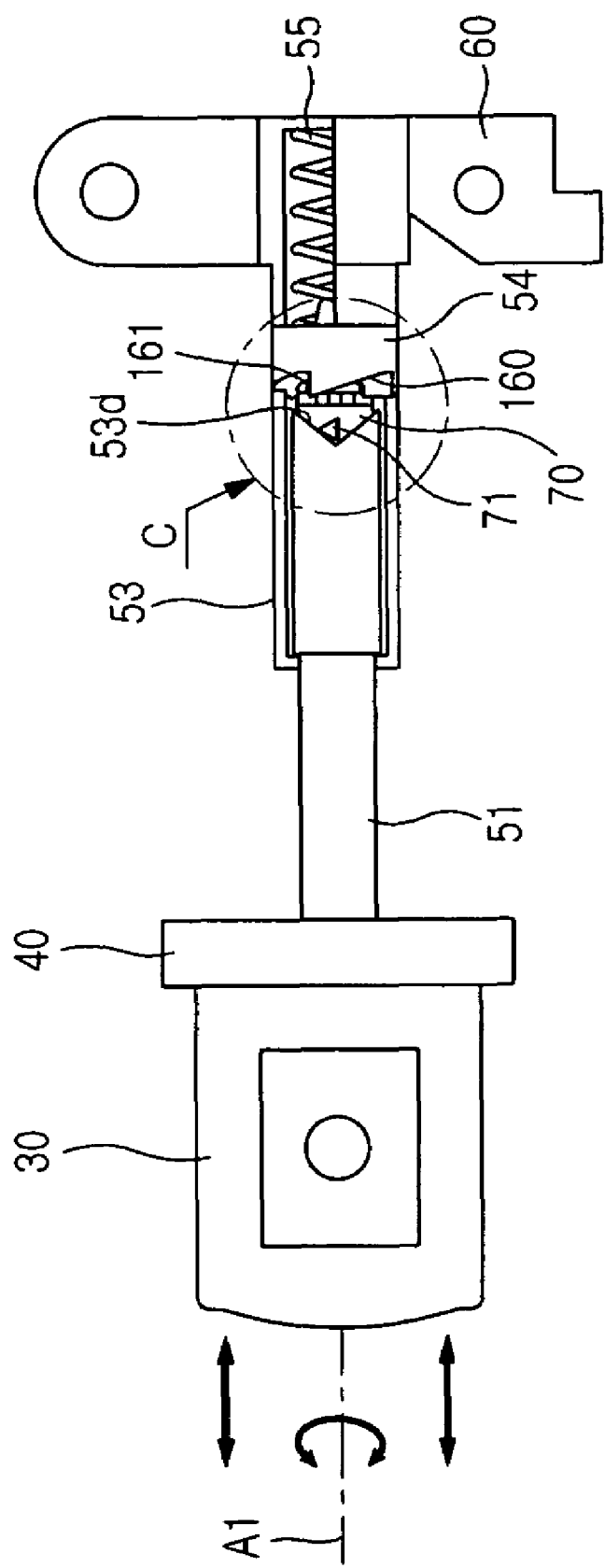
FIG. 7 is a side view illustrating an exemplary state before a camera lens module is extracted from the portable wireless device in accordance with an embodiment of the present invention.

With reference to FIG. 7, the extraction of the camera lens module 30 will be explained in more detail. When the camera lens module 30 is pushed laterally, the shaft 51, which was longitudinally screwed to the rotation cam unit 40, is moved along with the camera lens module 30 in the direction in which the camera lens module 30 is pushed.

Figure 8:
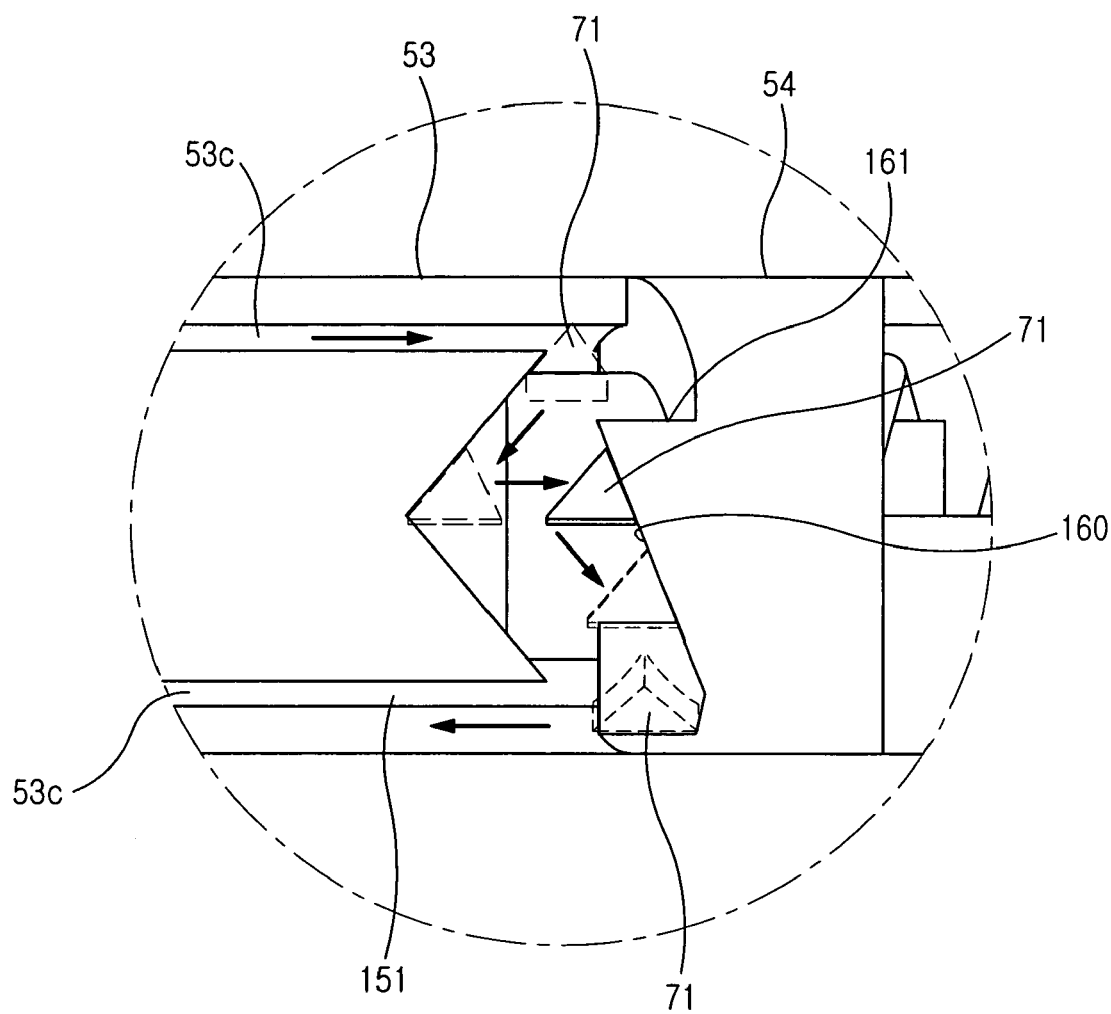
FIG. 8 is an enlarged side view of the circle (C) shown in FIG. 7.

In response to the lateral movement of the camera lens module 30, as shown in FIG. 8, the latches 71 of the latch member 70 on the shaft 51 are separated from the holding slits 53d formed at the lens stopper cam 53 of the lens pop-up module 50.

Simultaneously, the preferably inclined polygonal outer circumferences of the latches 71 come into contact with the inclined guide surfaces 160 of the guide cam 54. In this case, the latches 71 are guided along the inclined guide surfaces 160 so as to rotate in one direction.

The rotation of the latches 71 is stopped as the polygonal outer circumferences of the latches 71 are caught by the holding end surfaces 161 positioned at the lower side of the inclined guide surfaces 160.

Figure 9:
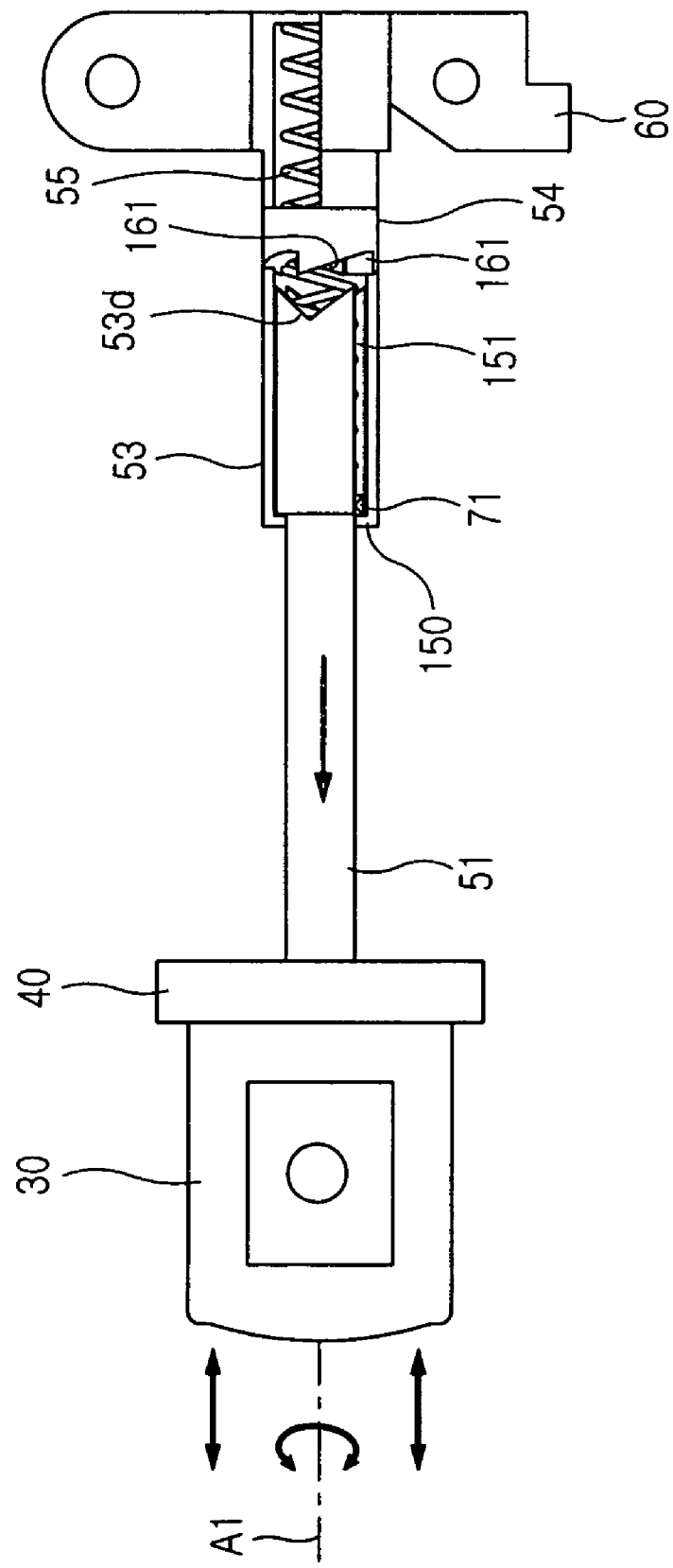
FIG. 9 is a side view illustrating an exemplary extracted state of the camera lens module shown in FIG. 7 according to an embodiment of the invention.

After that, as shown in FIGS. 8 and 9, the latches 71 are moved toward the sliding slits 53c of the lens stopper cam 53, and slide along the sliding slits 53c due to the elasticity of the coil spring 55 coupled around the shaft 51. In this way, the camera lens module 30 is extracted from the lens hole 23.

Figure 10:
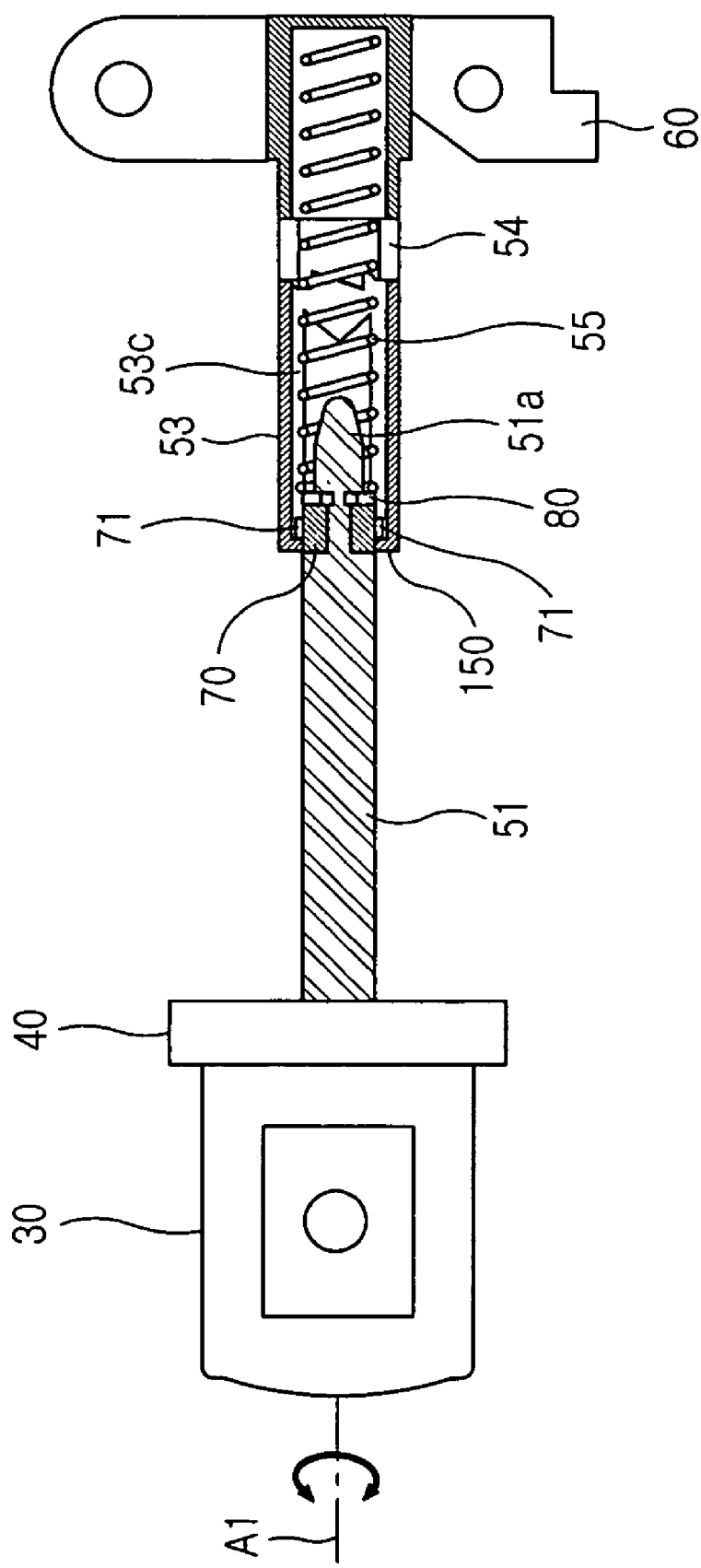
FIG. 10 is a side sectional view of FIG. 9.

Here, as shown in FIGS. 9 and 10, since one end of the shaft 51 is screwed into the lateral surface of the rotation cam unit 40, it is movable along with the camera lens module 30. The other end of the shaft 51 is formed with the spring coupling protrusion 51a and coupled to the coil spring 55. When the coil spring 55 is coupled around the spring coupling protrusion 51a, it provides elasticity to the shaft 51 sufficient to allow it to slide along with the camera lens module 30.

Further, referring to FIG. 10, since the shaft 51 is longitudinally coupled through the pop-up cylinder 52 (not shown), and the lens stopper cam 53 is positioned inside the pop-up cylinder 52 so as to restrain or release the shaft 51, the shaft 51 can be inserted into or extracted from the pop-up cylinder 52 as the camera lens module 30 is pushed laterally.

Referring now to FIG. 11, the cameral lens module 30 is shown extracted from the lens housing 24, which is formed, in this embodiment, in the lateral surface of the first housing 21 of the portable wireless terminal housing 20. Note the arrow illustrating the rotational motion of the camera lens module 30 about the hinge axis A1. Also note the straight two-headed arrow indicating the insertion and extraction motion of the camera lens module 30 along the longitudinal direction of the hinge axis A1.

Furthermore, as shown in FIGS. 1 and 2, since the pop-up cylinder 52 has the through-hole 52a, and the through-hole 52a is formed with the retaining portion 52b for retaining the shaft 51 when the shaft 51 is extracted along with the camera lens module 30, the extraction of the shaft 51 from the pop-up cylinder 52 can be stopped after the camera lens module 30 is extracted from the lens hole 23 by an appropriate distance.

Here, the other end of the pop-up cylinder 52 is screwed to the cylinder support member 60 provided inside the terminal housing 20, and thus can be supported thereby. In such a state, the cylinder support member 60 also supports the coil spring 55.

Figure 13:
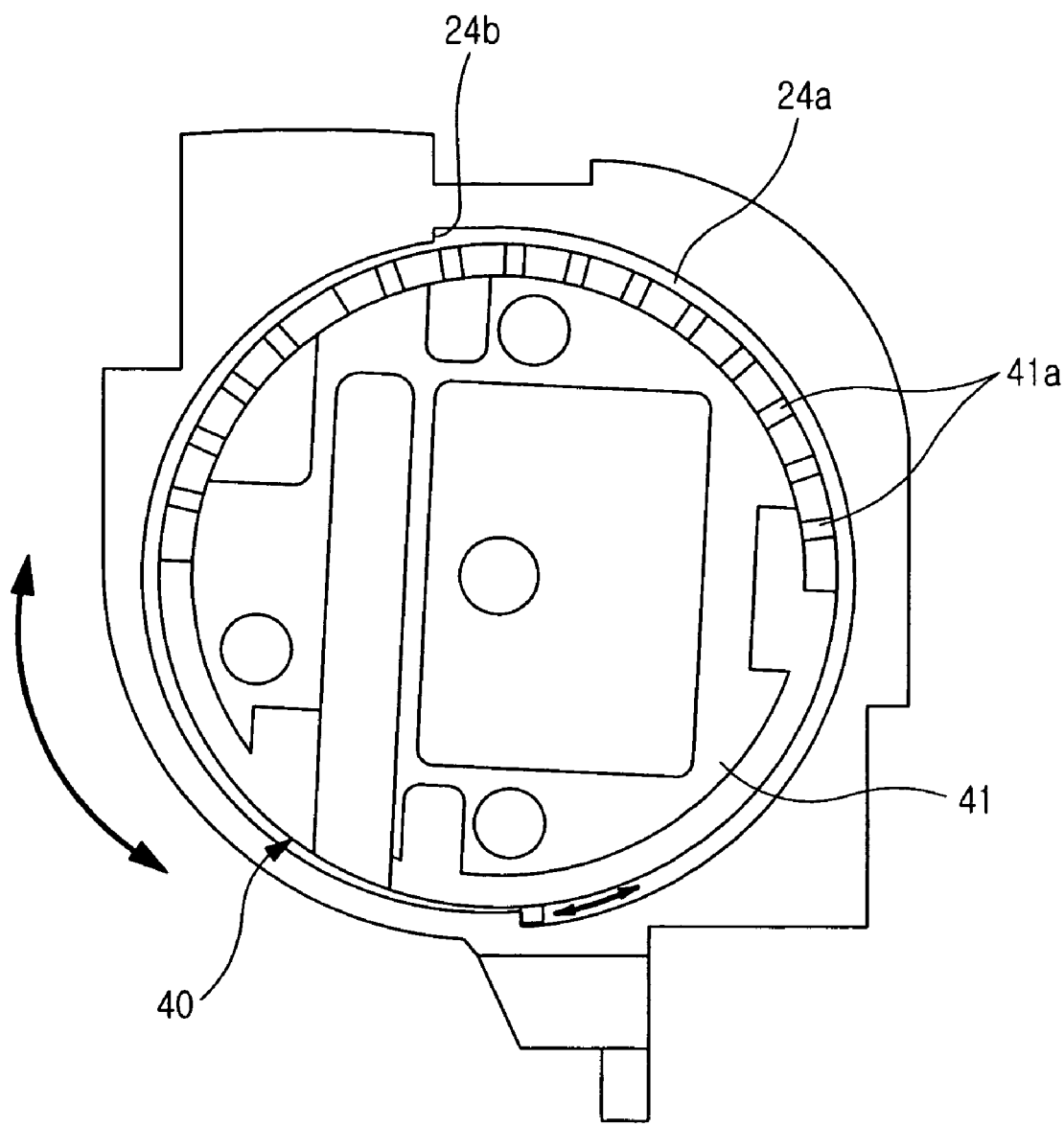

In a state wherein the shaft 52 is appropriately extracted from the pop-up cylinder 52, as shown in FIGS. 12 and 13, the rotation cam unit 40, provided at the end surface of the camera lens module 30, is coupled in the lens hole 23.

Figure 14:
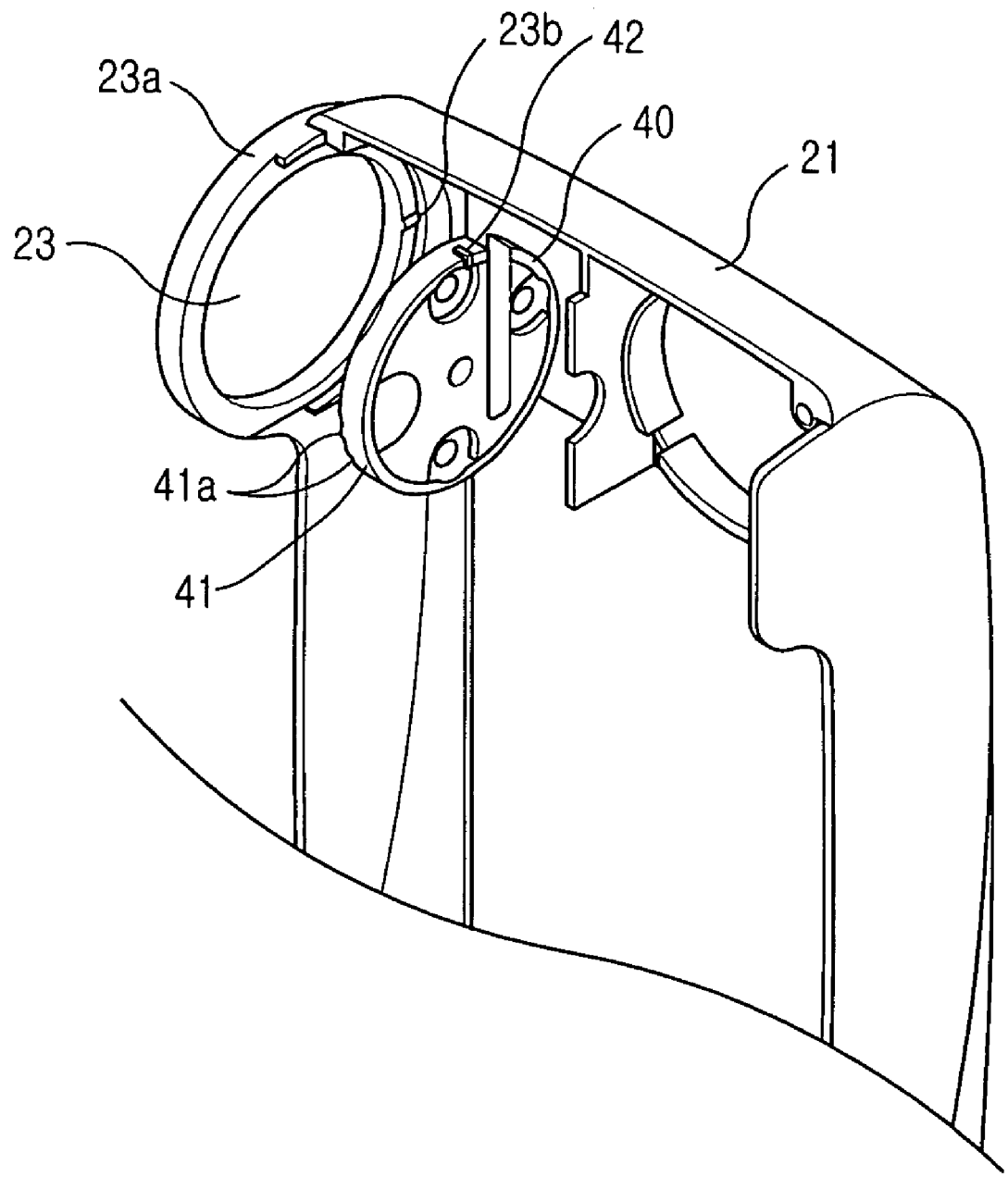
FIG. 14 is an exploded perspective view illustrating the rotation cam unit in accordance with the preferred embodiment of the present invention.
Figure 15:
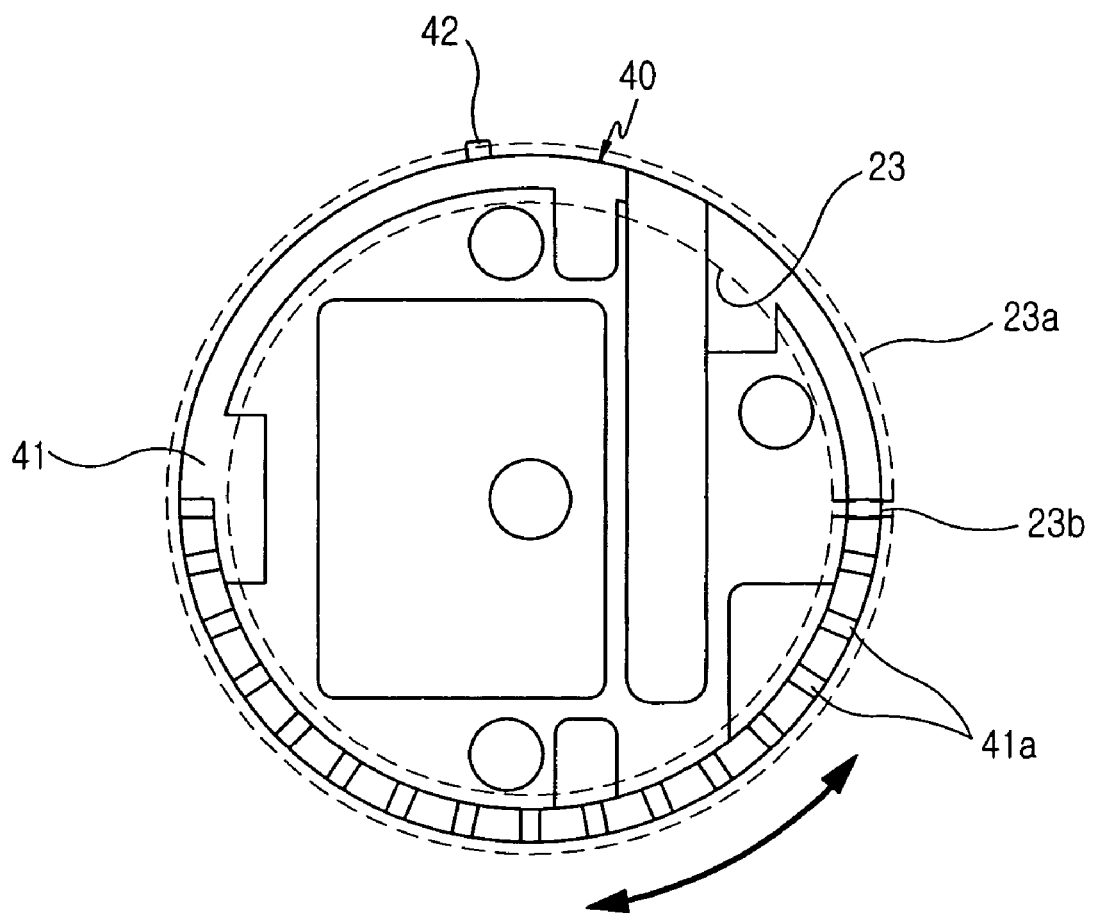
FIG. 15 is a sectional view illustrating the operational relationship between the rotation cam unit and the lens hole shown in FIG. 14.

For this, as shown in FIGS. 14 and 15, on the rotation ring 41, which is along the outer circumference of the rotation cam unit 40, is formed with the plurality of adjustment pin recesses 41a, which engage the adjustment pin 23b formed at the hole housing 23a of the lens hole 23.

As shown in FIGS. 12 and 13, the rotation ring 41 of the rotation cam unit 40 simultaneously rotates according to rotation of the camera lens module 30. When the rotation ring 41 rotates the adjustment pin 23b is separated from the previously engaged adjustment pin recess 41a and engages another one of the adjustment pin recesses 41a.

In this way, the rotation angle of the camera lens module 30 can be adjusted in a stepwise manner. The plurality of the adjustment pin recesses 41a are preferably arranged to adjust the rotation angle of the camera lens module 30 in approximately 10 degrees increments.

As shown in FIGS. 12 and 13, the rotation cam unit 40 is coupled inside the recess 24a defined at the inner peripheral surface of the lens housing 24 so as to rotate the camera lens module 30 forward or reverse within a range of 180 degrees.

When the camera lens module 30 is rotated forward or reverse within the range of 180 degrees, one of the stops 24b formed at both the ends of the recess 24a comes into contact with the detent 42 formed at the rotation cam unit 40, thereby acting to stop rotation of the camera lens module 30. With such a contact between the detent 42 and the stops 24b, therefore, it is possible to prevent the camera lens module 30 from rotating beyond 180 degrees.

Preventing the camera lens module 30 from rotating beyond 180 degrees has the effect of preventing tangling or damage to the FPCB (not shown) provided in the camera lens module 30.

Figure 16:
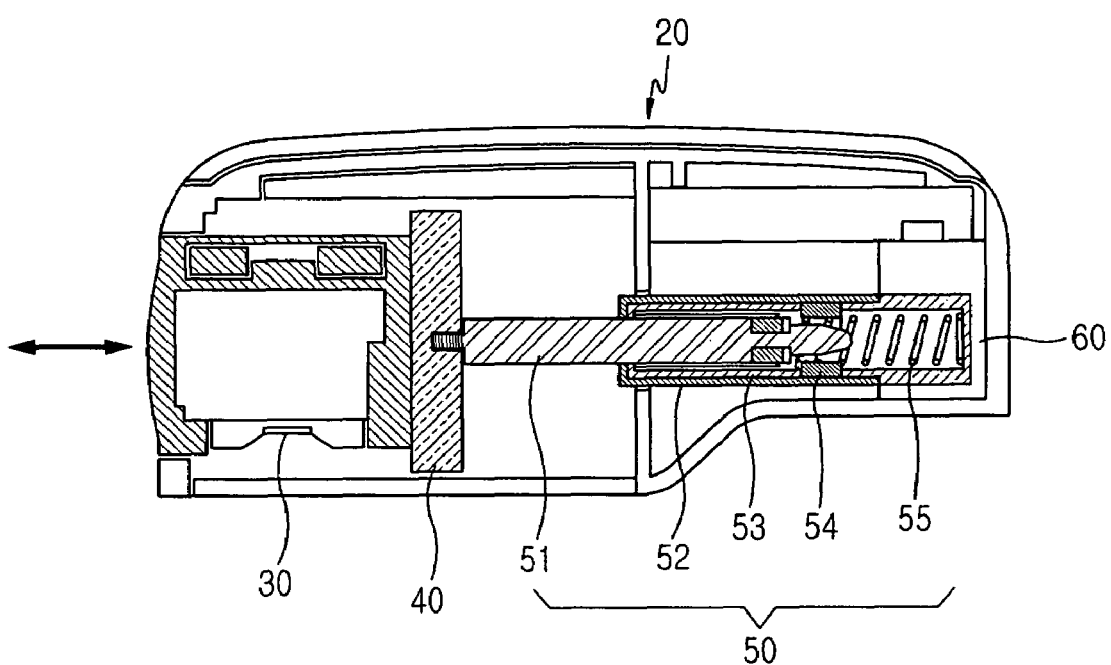
FIG. 16 is a side sectional view illustrating an exemplary completely inserted state of the camera lens module inside the terminal housing in accordance with the preferred embodiment of the present invention.

Referring to FIG. 16, the camera lens module 30 is inserted through the lens hole 23, when the camera lens module 30 is pushed laterally. The latches 71 of the latch member 70 provided at the shaft 51 are moved along the sliding slits 53c of the lens stopper cam 53, and are inserted into the pop-up cylinder 52.

In this case, as shown in FIG. 8, the latches 71 come into contact with the inclined guide surfaces 160 of the guide cam 54, and are guided and rotated in one direction.

Then, the latches 71 are inserted into the holding slits 53d, and are restrained thereby. In this way, the camera lens module 30 is maintained inside the terminal housing 20.

Here, since the holding slits 53d are tapered inward, the latches 71 guided by the holding slits 53d are fixedly maintained inward with respect to the holding slits 53d.

As apparent from the above description, the present invention provides a camera lens module pop-up device for a portable wireless terminal, which can allow a camera lens module to be inserted into or extracted from a terminal housing through a one-touch operation, thereby protecting a camera lens from the external environment and any foreign substances.

Further, the present invention enables stepwise adjustment of the rotation angle of the camera lens module, which results in improved convenience in the use of the camera.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

The invention claimed is:

1. A camera lens module pop-up device for a portable wireless terminal comprising:
   a terminal housing formed with a lens hole;
   a camera lens module coupled through the lens hole so that it can be inserted into or extracted from the lens hole as it is pushed laterally, and can rotate about a hinge axis thereof when extracted;
   a rotation cam unit provided at an end of the camera lens module for adjusting or retaining the rotation angle of the camera lens module in a stepwise manner when the camera lens module is extracted from the lens hole; and
   a lens pop-up module coupled to the camera lens module so as to extend in the direction of the hinge axis direction enabling the camera lens module to be inserted and extracted through the lens hole when the camera lens module is pushed laterally, and wherein the camera lens module rotates when extracted through the lens hole.

2. The device as set forth in claim 1, further comprising:
a lens housing provided inside the terminal housing for guiding the insertion and extraction of the camera lens module in the longitudinal direction of the camera lens module.

3. The device as set forth in claim 2, wherein the terminal housing includes first and second housings, wherein one of the first and second housings being formed with a lens hole on a lateral surface of either the first or second housing for allowing the lens housing, the camera lens module, the rotation cam unit, and the lens pop-up module to be successively coupled therein in the longitudinal direction of the camera lens module.

4. The device as set forth in claim 2, wherein the lens housing includes:
a recess defined at an inner peripheral surface thereof for use in the coupling of the rotation cam unit, the recess serving to allow the camera lens module to rotate either in a forward or reverse direction within a range of 180 degrees; and
stops formed at both ends of the recess for stopping rotation of the rotation cam unit when a detent formed at the rotation cam unit comes into contact with one of them.

5. The device as set forth in claim 1, wherein the rotation cam unit includes:
a rotation ring formed throughout an outer circumference of the rotation cam unit, and having a plurality of adjustment pin recesses, which are selectively engagable or disengagable with an adjustment pin formed at a hole housing of the lens hole in a stepwise manner according to the rotation of the camera lens module; and
a detent protruding outward from an outer circumference of the rotation ring so that it can move forward or reverse inside a recess defined at an inner peripheral surface of a lens housing.

6. The device as set forth in claim 1, wherein the lens pop-up module includes:
a shaft aligned with the camera lens module so as to be longitudinally attached to the rotation cam unit;
a pop-up cylinder for coupling the shaft therethrough;
a lens stopper cam positioned inside the pop-up cylinder for retaining or releasing the shaft so that the shaft can be inserted into or extracted from the pop-up cylinder as the camera lens module is pushed laterally;
a guide cam positioned to correspond to the lens stopper cam for guiding a latch member provided at the shaft; and
a coil spring positioned inside the pop-up cylinder as it is coupled around the shaft, the coil spring providing elasticity to the shaft so that the shaft can be inserted into or extracted from the pop-up cylinder.

7. The device as set forth in claim 6, wherein one end of the shaft is attached to the rotation cam unit, and the other end of the shaft forms a spring coupling protrusion for use in the coupling of the coil spring.

8. The device as set forth in claim 6, wherein the latch member provided at a certain position of the shaft is moved along with the shaft as the camera lens module is pushed laterally, thereby allowing the guide cam to be separated from the lens stopper cam and be rotated in one direction.

9. The device as set forth in claim 8, wherein the latch member is rotatably secured around a latch coupling rod formed at the shaft by interposing an E-ring.

10. The device as set forth in claim 8, wherein the latch member includes a pair of latches which are symmetrically positioned to each other about a hinge axis thereof.

11. The device as set forth in claim 8, wherein each of the latches includes an inclined polygonal outer circumference.

12. The device as set forth in claim 6, wherein the pop-up cylinder includes a through-hole for use in the insertion and extraction of the shaft.

13. The device as set forth in claim 12, wherein the through-hole is formed with a retaining portion for allowing the shaft to be caught and stopped thereby upon extraction.

14. The device as set forth in claim 6, further comprising:
a cylinder support member provided inside the terminal housing, the cylinder support member being screwed to one end of the pop-up cylinder so that it can support the coil spring.

15. The device as set forth in claim 6, wherein the lens stopper cam includes:
an opening formed at one end of the lens stopper cam for the longitudinal insertion and extraction of the shaft;
a plurality of stopper teeth circumferentially arranged at the other end of lens stopper cam so that they are engagable or disengagable with the guide teeth formed at the guide cam as the camera lens module is pushed laterally;
a pair of sliding slits defined at the lens stopper cam so as to extend in a longitudinal direction of the lens stopper cam for the sliding movement of latches formed at the latch member; and
a pair of holding slits formed between the sliding slits, respectively, for allowing the latches of the latch member to be inserted and fixed thereby after they slide along the sliding slits, and are guided and rotated by the guide cam.

16. The device as set forth in claim 6, wherein the guide cam includes guide teeth formed at a lateral surface thereof, the guide teeth being capable of guiding latches of the latch member.

17. The device as set forth in claim 16, wherein the guide teeth includes:
inclined guide surfaces, when the latches of the latch member are circumferentially moved toward the guide teeth, and thus come into contact with the guide cam, the inclined guide surfaces rotating the latches in one direction; and
holding end surfaces formed at one-side end of the respective inclined guide surfaces, the holding end surfaces being engaged with the latches for stopping rotation of the latches.

18. The device as set forth in claim 15, wherein each of the sliding slits includes:
a retainer portion formed at one end thereof for allowing the latches of the latch member to be caught thereby when the shaft is extracted along with the camera lens module as the camera lens module is laterally pushed, thereby stopping extraction of the shaft; and
an insert portion formed at the other end of each of the sliding slits for the insertion of the latches of the latch member.

19. The device as set forth in claim 15, wherein each of the holding slits is tapered inward for guiding the latches of the latch member so that the latches can be inserted therein or separated therefrom.

20. The device as set forth in claim 1, wherein, as the camera lens module is pushed laterally for inserting the camera lens module inside the terminal housing, latches of a latch member are moved along sliding slits of a stopper cam and are inserted into a pop-up cylinder, so that they come into contact with inclined guide surfaces of a guide cam and are guided and rotated in one direction, thereby being inserted into holding slits, and maintaining the camera lens module inside the terminal housing, and wherein, as the camera lens module is again pushed laterally, the latches of the latch member are separated from the holding slits, and come into contact with the inclined guide surfaces of the guide cam to be guided and rotated in one direction until they are caught by holding end surfaces formed at one-side ends of the respective inclined guide surfaces, so that they can be moved toward the sliding slits of the stopper cam and can slide due to elasticity of a coil spring, thereby allowing the camera lens module to be extracted from the terminal housing.

* * * * *